United States Patent [19]

Ward

[11] 4,195,138
[45] Mar. 25, 1980

[54] CHELATE RESINS PREPARED FROM THE CURED REACTION PRODUCT OF A POLYALKYLENEPOLYAMINE AND EPOXIDE

[75] Inventor: Eldon L. Ward, Angleton, Tex.

[73] Assignee: The Dow Chemical Company, Midland, Mich.

[21] Appl. No.: 918,874

[22] Filed: Jun. 26, 1978

[51] Int. Cl.$^2$ ............... C08G 59/16; C08G 73/02; C08J 7/14
[52] U.S. Cl. .................. 525/404; 210/38 R; 521/34; 525/408; 525/531; 525/533; 528/123; 528/407; 525/507; 525/403; 525/523
[58] Field of Search ............ 260/823, 836, 837 R; 528/123, 404, 407, 135; 521/34

[56] References Cited

U.S. PATENT DOCUMENTS

| | | | |
|---|---|---|---|
| 3,228,920 | 1/1966 | D'Alelio | 260/88.1 |
| 3,310,530 | 3/1967 | White | 260/47 |
| 3,352,801 | 11/1967 | White | 260/2.2 |
| 3,354,103 | 11/1967 | White | 260/2.2 |
| 4,026,831 | 5/1977 | Moriya et al. | 260/2.1 R |
| 4,032,482 | 6/1977 | Moriya et al. | 260/2.2 R |

*Primary Examiner*—Earl A. Nielsen

[57] ABSTRACT

Chelate resins are obtained by introducing an effective amount of chelate active groups into the cured reaction product of an epoxide and a polyalkylenepolyamine. For example, an alkali metal salt of a halogenated carboxylic acid such as sodium chloroacetate, is reacted with the reaction product of triethylenetetraamine and diglycidyl ether of bisphenol A to form a chelate resin.

14 Claims, No Drawings

CHELATE RESINS PREPARED FROM THE CURED REACTION PRODUCT OF A POLYALKYLENEPOLYAMINE AND EPOXIDE

BACKGROUND OF THE INVENTION

This invention relates to chelate resins and to method of preparing such resins.

Chelation may be defined as an equilibrium reaction between a metal ion and the functional groups of a chelating agent characterized by the formation of more than one bond between the metal and a molecule of the chelating agent. In this manner, chelating agents control metal ions by blocking the reactive site of the metal ion and preventing it from entering into its normal and oftentimes undesirable reactions. For this reason, chelating agents are often used in purification processes such as the control of undesirable metal ions in water or other liquids.

Chelate resins are normally solid chelating agents which have the ability to extract metal ions from a liquid without substantial structural alteration of the solid resin. The most effective chelate resins possess capacity to chelate with a large number of metal ions before the need for regeneration, i.e., preparing the resin for reuse by displacing the metal ions removed by the resin. They also advantageously exhibit a high porosity and are resistant to physical deterioration such as excessive swelling or shattering. Moreover, to obtain maximum benefit of the resin's properties, a spheroidal particle size is often desirable.

Heretofore, chelate resins have been conventionally prepared by the addition of chelate active functional groups to an insoluble resin matrix such as a cross-linked, vinyl aromatic polymer, e.g., a cross-linked polystyrene. A method for adding iminodiacetic acid chelate active groups to such resins by the sequential steps of halomethylation amination and carboxylation is disclosed in *Ion Exchange*, by F. Helfferich, published in 1962 by McGraw-Hill Book Company, New York. Alternatively, the iminodiacetic acid groups are added to such resins by the reaction of halomethylated resin with a nitrile containing amine and the hydrolysis of the reaction product. See, for example, U.S. Pat. No. 3,043,809 to Mattano. Unfortunately, such methods require numerous process steps, each of which require relatively exacting control to prevent unwanted side reactions. Moreover, the resins prepared by such methods possess relatively low chelate stability constants with may multivalent cations.

Several improved methods for preparing chelate resins have been proposed. For example, U.S. Pat. No. 3,228,920 to D'Alelio discloses chelate resins which can easily be prepared by reacting a compound having an active hydrogen and a coordination group such as glycine which reacts with a cross-linked polymer having a functional group such as oxirane or carboxyl halide to form a chelate resin.

Similarly, U.S. Pat. Nos. 3,310,530; 3,352,801 and 3,354,103 to White teach that sequestering agents having certain reactive groups, e.g., an epoxy, an NH group, active hydrogen and the like, can be attached to cross-linked polymers containing a coreactive group to form chelate type resins. Alternatively, cross-linking can follow the attachment of the sequestering group. Unfortunately, the chelate resins prepared by such methods possess relatively low chelate exchange capacities, thereby requiring frequent regeneration during use.

In view of the stated deficiencies of the prior art, it remains highly desirable to economically and efficiently prepare chelate resins having a high capacity for multivalent metal ions.

SUMMARY OF THE INVENTION

Accordingly, one aspect of the present invention is a method for preparing chelate resins comprising the step of introducing an effective amount of chelate active groups into the cured reaction product of an epoxide and polyalkylenepolyamine. By the term "effective amount of chelate active groups" it is meant an amount sufficient to form a chelate resin.

Another aspect of the present invention is a chelate resin of the cured reaction product of an epoxide and polyalkylenepolyamine having an effective amount of chelate active groups introduced therein.

In a preferred embodiment of this invention, the chelate resins of this invention are prepared in bead form by a method comprising the steps of (1) dispersing a blend of an epoxide and a polyalkylenepolyamine in a reaction medium of a concentrated aqueous solution of an alkali metal hydroxide; (2) maintaining the dispersed blend at conditions sufficient to cure the blend in the form of normally solid, discrete, spheroidal beads; and (3) introducing an effective amount of chelate active groups into the cured beads.

In an embodiment of particular interest, the chelate active groups are carboxyl groups. In such embodiment, a method for introducing carboxyl groups into the cured reaction product of the polyalkylenepolyamine and epoxide comprises contacting said cured reaction product with an effective amount of a carboxyl containing compound at conditions such that the carboxyl groups of said carboxyl containing compound become pendant to the polymer chain of the cured reaction product. Alternatively, the introduction of carboxyl groups comprises the steps of (1) diffusing an effective amount of $\alpha,\beta$-ethylenically unsaturated carboxylic acid into the cured reaction product and (2) polymerizing the diffused acid.

Surprisingly, introduction of the chelate active groups into the reaction product of an epoxide and a polyalkylenepolyamine forms a chelate resin which is substantially water insoluble and has an excellent chelate-exchange capacity. When prepared in bead form, the chelate resins are of approximate uniform size and generally spheroidal and unbroken, e.g. not cracked or spalled.

The chelate resins made in accordance with this invention are useful in controlling water hardness, e.g., removing $Ca^{++}$ and/or $Mg^{++}$ from water. They are also useful for controlling other multivalent metal ions in a wide variety of applications including food processing, metal finishing and plating, pulp and paper manufacturing, textile and leather processing. Moreover, the chelate resins are useful as additives in fertilizers as a means of correcting micronutrient deficiencies.

DETAILED DESCRIPTION OF THE INVENTION

Epoxides suitably employed in the practice of this invention are polyfunctional epoxides which contain sufficient functionally to form a cross-linked network when reacted with a polyalkylenepolyamine as hereinafter described in accordance with the method of this invention. Polyfunctional epoxides suitably employed include polyepoxides, i.e., epoxides which contain two or more oxiranyl functional groups

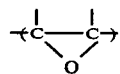

and monoepoxides, i.e., epoxides which contain one oxiranyl functional group and one other functional group.

Representative monoepoxides include organic compounds having an α-halo-β,α-epoxy arrangement such as epihalohydrin, 1,2-epoxy-2-methyl-3-halopropane, 1,2-epoxy-2-methyl-3-halopropane and the like wherein the other reactive functional group is a halogen radical such as Cl— or Br—; and ethylenically unsaturated organic compounds such as 3,4-epoxy-1-butene wherein the other functional group is an alkenyl unsaturation.

Representative polyepoxides advantageously employed are polyepoxides of aliphatic, alicyclic and aromatic hydrocarbons and combinations thereof. The term "aliphatic, alicyclic, and aromatic hydrocarbons" includes inertly substituted aliphatic, alicyclic and aromatic hydrocarbons. By the term "inertly substituted hydrocarbon" it is meant a hydrocarbon having one or more substituent group(s), such group(s) being inert to the polymerization and cross-linking of the polyepoxide. Polyepoxides of aliphatic, alicyclic and aromatic hydrocarbons are well known in the art and reference is made thereto for the purposes of this invention. Illustrative examples of such polyepoxides are shown in the *Handbook of Epoxy Resins* by H. Lee and K. Neville published in 1967 by McGraw-Hill, New York, in Appendix 4-1, pages 4-35 to 4-56. Of particular interest in this invention are diglycidyl phenyl ethers, epoxidized butadiene, and the polyepoxides having two or more

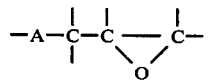

groups wherein each —A— is independently an electron donating substituent such as

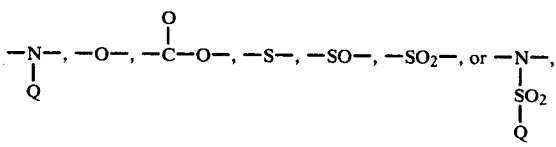

or a covalent bond and Q is an alkyl, alicyclic or aromatic hydrocarbon. Representative examples of the aforementioned polyepoxides include triglycidyl-p-aminophenol, o-glycidylphenylglycidyl ether, 2,6-(2,3-epoxypropyl)-phenylglycidyl ether, triglycidyl-4,4-bis-(4-hydroxyphenol)-pentanoic acid; polyglycidyl ethers such as the diglycidyl ethers of butanediol, bisphenol A, bisphenol F, bisphenol S, ethylene glycol, propylene glycol, polyethylene glycol, polypropylene glycol, glycerol and water initiated polymerized epihalohydrin; the triglycidyl ether of glycerol; polyglycidyl ethers of poly-o-cresolformaldehyde, polyphenol-formaldehyde, polybutadiene; and the like; and the polyglycidyl ethers such as diglycidyl isophthalate, diglycidyl phthalate and the like.

Mixtures of the monoepoxides, polyepoxides or combinations thereof are also suitably empolyed in this invention. Preferred epoxides include the epihalohydrins and the aromatic based polyepoxides, i.e., those polyepoxides having one or more aromatic constituent. Especially preferred are epichlorohydrin, diglycidyl ether of bisphenol A, bisphenol F; and the polyglycidyl ether of polyphenol-formaldehyde.

Polyalkylenepolyamines suitably employed in the practice of this invention include polyamines of aliphatic, alicyclic and aromatic hydrocarbons and inertly substituted aliphatic, alicyclic and aromatic hydrocarbons which have a sufficient functional group to form a cross-linked network when reacted with a suitable epoxide in accordance with the present invention. Typically, functionality is the number of hydrogens attached directly to the nitrogen of the polyalkylenepolyamine which are capable of reacting with the epoxide such that polymerization and subsequent cross-linking can occur. Generally, when three or more of such amino hydrogens are present, the polyalkylenepolyamine is suitably employed in this invention. Representative examples of polyalkylenepolyamines suitably employed in the practice of this invention include polymethylenediamines, such as ethylenediamine and 1,3-propanediamine, polyetherdiamines, diethylenetriamine, iminobispropylamine, bis(hexamethylene)-triamine, triethylenetetraamine, tetraethylenepentaamine, pentaethylenehexaamine, aminoethylethanolamine, methyliminobispropylamine, dimethylaminopropylamine, diethylaminopropylamine, methanediamine, bis(2-aminoethyl)-sulfide; 1,6-hexanediamine; N-aminoethyl-piperazine, 1,3-diaminocyclohexane, isophoronediamine, m-xylylenediamine, tetrachloro-p-xylenediamine, 1,4-bis-(2-aminoethyl) piperazine, piperazine and the like and combinations thereof. Polyalkyleneimines are also suitably employed in the practice of this invention. Representative examples of polyalkyleneimines include polyethyleneimine, polypropyleneimine and the like. Preferred polyalkylenepolyamines include ethylenediamine, diethylenetriamine; triethylenetetraamine; 1,3-propanediamine; bis(2-aminoethyl) sulfide; 1,6-hexanediamine; and polyethyleneimine, with triethylenetetraamine and diethylenetriamine being especially preferred.

In the practice of this invention, the proportions at which the epoxide and polyalkylenepolyamine are employed are not critical provided that each reactant, i.e., the polyalkylenepolyamine and epoxide, is employed at a proportion such that a blend of said reactants contain sufficient of each reactive functionality for polymerization and cross-linking to a degree sufficient to form normally solid material. Typically, a reactant blend having a reactive ratio (expressed as the number of epoxy equivalents to the number of amino hydrogen equivalents) from about 0.1:1 to about 1:1 contains sufficient functionality for polymerization and cross-linking to form a cured resin. Preferably, a reactant ratio from about 0.2:1 to about 0.8:1 is employed. For purposes of this invention, epoxy equivalent comprises the reactive functional groups on the epoxide, including the oxiranyl functional groups and the other reactive functional groups as hereinbefore defined. Amino hydrogen equivalents refer to the reactive hydrogen atoms bonded to the nitrogen atoms of one molecule of the polyalkylenepolyamine.

In a preferred embodiment of this invention, the polyalkylenepolyamine and epoxide reaction product is advantageously prepared in bead form by dispersing a blend of the polyalkylenepolyamine and epoxide in a reaction medium of a concentrated aqueous solution of an alkali metal hydroxide and maintaining the dispersed blend until cured in bead form.

The reaction medium in this embodiment comprises a concentrated aqueous solution of an alkali metal hydroxide and optionally a suspending agent. Alkali metal hydroxides suitably employed in the practice of this embodiment include sodium, potassium and lithium hydroxides or combinations thereof. The alkali metal hydroxide is dissolved in water in an amount sufficient to cause the reactant blend of polyalkylenepolyamine and epoxide to become substantially insoluble in the resulting aqueous solution. This concentration will vary depending on the composition of the polyalkylenepolyamine, epoxide and the alkali metal hydroxide employed. In general, minimum concentrations of about 40 weight percent of alkali metal hydroxide based on the total weight of alkali metal hydroxide and water are suitably employed. Preferably, a minimum concentration of at least 50 weight percent based on the total weight of alkali metal hydroxide and water is employed.

Optionally, the aqueous solution of concentrated metal hydroxide also contains a suspending agent therein. Representative examples of suspending agents useful in the practice of this invention are anionic or non-ionic compounds which prevent excessive agglomeration of the individual droplets of the reactant blend. Suitable suspending agents include hydroxyalkyl cellulose such as hydroxypropyl methylcellulose; hydroxyethyl cellulose and ethyl hydroxyethyl cellulose; carboxylated methylcellulose, carboxymethylated methylcellulose; modified starches such as white dextrin and canary dextrin; and xanthum gum. Suspending agents which have been found to be particularly useful include methylcellulose having a methoxy degree of substitution (M.D.S.) from about 1.5 to about 2.0 and a viscosity at 20° C. in a 2 percent by weight aqueous solution of below about 5600 cps; hydroxypropyl methylcellulose having a M.D.S. from about 1.0 to about 1.6 and hydroxypropyl D.S. of from about 0.1 to 0.30 and a viscosity at 20° C. in a 2 percent by weight aqueous solution of below about 1500 cps; and carboxymethylated methylcellulose having a M.D.S. between about 0.5 to about 2.5, a carboxymethylated degree of substitution (CMC D.S.) between about 0.1 and about 0.7 and a viscosity in a 2 percent aqueous solution at 20° C. of less than about several hundred. Other suspending agents useful herein are readily determined by experimentation.

The effectiveness of the suspending agent depends upon its composition, its concentration, the proportions and types of reactants employed, the reaction conditions and the droplet size desired. Typically, in many applications, concentrations from about 1 to about 5 weight percent based on the weight of the water and alkali metal hydroxide are effective.

In the practice of this embodiment the reactants, i.e., the polyalkylenepolyamine and epoxide, are preferably blended at their desired proportions prior to their dispersion in the reaction medium. Such blend is preferably neat, i.e., contains nothing other than the reactants. Alternatively, the reactants are added separately at the reaction medium at the desired proportions.

The addition of the reactant blend to the reaction medium may be continuous, batch or intermittent. The point of addition of the reactants to the reaction medium is not critical, although sub-surface addition is preferred over surface addition.

Preferably, the volume percent of the dispersed phase, e.g., the blended polyalkylenepolyamine and epoxide, in the reaction medium is such that the volume percent of the disperse phase expressed as the ratio of the volume of the reaction medium to the volume of the initial reactant blend is from about 1:1 to about 15:1. The higher percentages of the disperse phase, e.g., volume ratio of 1:1 to about 5:1 are preferred when a suspending agent is employed. When no suspending agent is employed, lower percentages of the disperse phase, e.g., volume ratio from about 6:1 to about 15:1, are preferred.

The temperature of the aqueous alkali metal hydroxide solution upon the addition of the reactant blend is advantageously a temperature such that the droplets comprising the reactant blend are polymerized and partially cured within a relatively short time following their addition. Generally, a time of less than about 10 minutes, more preferably, less than about 2 minutes, is desired to achieve partial cure. By the term "partial cure" it is meant the droplets of the reactant blend are sufficiently solid to remain discrete and retain their spheroidal shape upon their separation from the reaction medium by physical means such as filtration. Initial reaction temperatures suitably employed are dependent upon the composition of the polyalkylenepolyamine-epoxide reactant blend, the relative reactivity of the reactants and the suspending agent employed. Typically, temperatures between about 50° to about 135° C. are advantageously employed for many reactant blends. The lower temperatures, e.g., about 50° to about 90° C., are generally preferred when a suspending agent is employed. When no suspending agent is employed, the higher temperatures, e.g., about 70° to about 135° C., are preferred to provide a faster cure which prevents excessive agglomeration of the particles prior to their cure into hard resin beads.

The partially cured beads are advantageously maintained in the aqueous solution and at elevated temperatures, e.g., about 50° to about 135° C., for an additional reaction period to insure cure is complete. The length of this additional reaction period is dependent upon the composition of the reactant blend, the reaction temperature and the size of each individual droplet. Typically, additional reaction periods from about 0.5 to about 3 hours are sufficient to complete the cure. In many cases, the temperature of this additional cure is advantageously the initial reaction temperature. However, when the initial reaction temperature is low, e.g., about 50° C. to about 90° C., the temperature of the aqueous solution is advantageously increased, e.g., to a temperature from about 70° C. to about 135° C. following the partial cure to all the droplets in the aqueous solution. Employment of a low initial reaction temperature with a subsequent increase in temperature is particularly advantageous when using a suspending agent in the reaction medium.

The reaction medium is advantageously agitated during all stages of the reaction, e.g., addition of the reaction blend, partial cure and completion of the cure. The rate and type of agitation are not critical to the practice of this invention provided the agitation is sufficient to (1) form droplets of the reactant blend upon its introduction to the aqueous solution and (2) disperse the resulting droplets in the reaction medium.

The droplet size and the size of the subsequently formed beads are advantageously controlled and are desirably uniform for any reaction product. Droplet size is primarily dependent determined by the rate and type of agitation and by the concentration and type of the suspending agent employed. In a normal operation, beads having nominal diameters of between about 0.07 and about 4 mm are generally formed. Typically, smaller droplets, e.g., as small as 5 microns, are formed at higher rates of agitation and at greater concentrations of the suspending agent, while larger size droplets, e.g., above 4 mm, are formed at lower agitation rates and smaller concentrations of the suspending agent. Droplet sizes and the sizes of the subsequently cured beads are easily determined by experimentation.

Following the preparations of the cured beads, the beads are easily separated from the aqueous solution by conventional filtration techniques. Following filtration, the recovered beads are advantageously washed to remove any excess alkali metal hydroxide which may be present. The beads are then advantageously dried, yielding a hard resin bead.

Alternatively, the cured reaction may be prepared in granular form by blending the reactants at their desired proportions and allowing the blend to react to a cured state, as evidenced by a hardening of the blend to a normally solid form. The reaction is advantageously carried out while the blend is exposed to ambient temperatures, i.e., between about 20° and about 25° C., without external heating or cooling applied. Generally, at these conditions, the blend is rendered hard, i.e., cured, in from about 0.1 to about 3 hours.

The cured reaction product is then advantageously broken into small particles or a powder. Preferably, such powder or particles have an average particle size such that at least about 80 weight percent, preferably at least about 90 weight percent of the powder or particles pass through a 12 mesh screen. Advantageously, the largest particles will pass through a 12 mesh screen, preferably a 20 mesh screen.

The thus prepared cured reaction product of the polyalkylenepolyamine and epoxide, hereinafter referred to as "cured reaction product" is converted to a chelate resin by the introduction therein of an effective amount of chelate active groups. For the purposes of this invention, a chelate resin is a normally solid material which has the capacity to chelate with a multivalent metal ion, i.e., a normally solid material which has introduced therein an effective amount of chelate active groups. By the term "chelate active groups" it is meant those functional groups, each of which is capable of forming a bond with a multivalent metal ion, which when employed in an effective amount impart to the material having the chelate active groups introduced therein a capacity to chelate with multivalent metal ions. As used herein, the term "introduction of chelate active groups" means that the chelate active groups become attached to the cured reaction product by either a chemical bond or by physical means, e.g., diffusing a polymerizable acid into the structure of the cured reaction product and polymerizing the diffused acid therein. In this invention, the "capacity to chelate with multivalent metal ions" is determined in the following manner. Four grams of the material being tested is transferred by a water rinse into a standard 10 ml burette (6 mm nominal inside diameter) and the volume of beads recorded. An aqueous solution of 100 ml of 0.1 molar (0.2 normal) calcium chloride ($CaCl_2$) is fed down through the opened burette for one hour at a rate of 1.67 ml per minute. The effluent is collected in a suitable size beaker or flask. Following the addition of the $CaCl_2$ solution, 100 ml of deionized water is fed through the open burette at a rate of 2 ml per minute. The effluent is collected and combined with the previous effluent. Two drops of a saturated Murexide indicator (ammonium salt of purpuric acid) in water solution are added to the combined effluents which are then titrated with an aqueous solution of 0.1 molar standarized ethylenediamine tetraacetic acid (0.1M-EDTA) to an end point evidenced by a sharp color change from red-violet to yellow-green. The capacity of the resin for calcium in milliequivalents per milliliters (meq/ml) is found by the following equation:

$$\frac{(100 \text{ ml}) (0.2 \text{ N}) - (\text{Volume of ethylenediamine tetraacetic acid in ml}) (0.2 \text{ N})}{(\text{Volume of resin in ml})}$$

The material being tested is presumed to be a chelate resin, i.e., have an effective amount of chelate active groups introduced therein, whenever the capacity for calcium is greater than 0.05 meq/ml. Preferably, the chelate resins of this invention have a capacity for calcium of at least 0.2 meq/ml, more preferably at least 0.5 meq/ml. Although for the purposes of this invention, a chelate resin is defined as the ability to chelate with calcium, it is understood that the chelate resins of this invention may have similar chelating capacity for other multivalent metal ions.

In an embodiment of particular interest, the chelate active groups are carboxyl groups. By "carboxyl group" it is meant a

wherein Y is H or an alkali metal such as Na, K or Li. In such embodiment, an effective amount of carboxyl groups are introduced into the cured reaction product by contacting the cured reaction product with an effective amount of a carboxyl containing compound at conditions such that the carboxyl groups of said compound become pendant to the polymer chain of the cured reaction product. Carboxyl containing compounds suitably employed in this embodiment are compounds having a carboxyl group and a reactive group which is reactive with an amino hydrogen, i.e., that hydrogen attached directly to the primary or secondary nitrogen atom in the cured reaction product. Representative examples of such carboxyl containing compounds include the halogenated carboxylic acids and alkali metal salts of such acids, wherein the reactive group is an activated halogen; and the $\alpha$, $\beta$-ethylenically unsaturated carboxylic acids and alkali metal salts of such acids, wherein the reactive group is an alkenyl group. Advantageously, the halogenated carboxylic acids and their alkali metal salts contain from about 2 to about 6 carbon atoms and the $\alpha,\beta$-ethylenically unsaturated carboxylic acids contain from about 3 to about 6 carbon atoms. Representative of the former are halogenated acetic acid, propionic acid, butyric acid, valeric acid, caproic acid, $\alpha$-methylbutyric acid and their alkali metal salts. Representative of the latter are acrylic acid, methacrylic acid, crotonic acid, isocrotonic acid and their alkali metal salts. Preferred alkali metal acid-salts are the sodium salt of chloroacetic acid, chloropropionic acid, acrylic acid or methacrylic acid; acrylic acid and methacrylic acid. Hereinafter, the halogenated carboxylic acids, the $\alpha,\beta$-ethylenically unsaturated carboxylic acids and alkali metal salts of such acids will be referred to as "alkali metal acid-salts."

Advantageously, in this embodiment the introduction of the carboxyl groups comprises contacting the alkali metal acid-salt with the cured reaction product in an aqueous alkaline medium having the alkali metal acid-salt dissolved therein. Beneficially, the alkaline medium is maintained at a pH from about 8 to about 14. Such pH is easily obtained by many of the methods well known in the art with a preferred method being the use of an alkali metal hydroxide having the same alkali metal component as the alkali metal acid-salt. When employing an acid as the carboxyl containing compound, this preferred procedure converts the acid to a desired salt. Advantageously, the aqueous alkaline medium having the carboxyl containing compound and cured reaction product therein is maintained at temperatures between about 50° C. and about 100° C. for a period sufficient to form a chelate resin. Typically, such period ranges from about 1 to about 10 hours.

The alkali metal acid-salt is employed in an effective amount, i.e., an amount such that upon introduction of the carboxyl groups into the cured reaction product, a chelate resin is formed. Such amount will vary depending on many factors including the composition of the cured reaction product and the specific alkali metal acid-salt employed. Typically, a chelate resin is formed when the reactants are employed in amounts such that a reactant ratio, expressed as the number of carboxyl groups to the number of amino hydrogens in the polyalkylenepolyamine prior to its reaction with the epoxide is from about 0.5:1 to about 2:1. Preferably, a reactant ratio of about 0.6:1 to about 1.5:1, more preferably 0.75:1 to about 1.2:1 is employed.

Alternatively, introduction of the carboxyl groups into the cured reaction product comprises diffusing into the structure of the cured reaction product an $\alpha,\beta$-ethylenically unsaturated carboxylic acid at conditions such that essentially none of the acid is chemically bound to the cured reaction product and subsequently polymerizing the diffused acid. In this manner, the chelate resin is the cured reaction product having incorporated therein a polymerizate of the alkali metal acid-salt. Advantageously, such method comprises contacting the unsaturated carboxylic acid with the cured reaction product in an aqueous liquid with agitation at temperatures from about 10° to about 40° C. During such contact, the unsaturated acid diffuses into the cured reaction product as evidenced by a swelling thereof. Maximum diffusion of the acid into the cured reaction product is desired. Typically, contact periods between about 0.1 to about 3 hours provide for such maximum diffusion. The acid is then polymerized using conventional free radical type polymerization techniques. Following polymerization the polymerized acid is incorporated within the cured reaction product as evidenced by a weight gain thereof. The chelate resin thus formed is easily recovered by filtration or other similar techniques.

The unsaturated acid is advantageously employed in amounts such that (1) essentially all the acid diffuses into the cured reaction product prior to polymerization and (2) following polymerization, a chelate resin is formed, i.e., an effective amount. Excess amounts of acid, i.e., amounts in excess of those which can diffuse into the cured reaction product, are beneficially minimized. Preferably, such excess acid is less than about 10 weight percent of the weight of the acid employed. Such excess amount is evidenced by a viscosity increase in the aqueous liquid during polymerization. Typically, a reactant ratio, as defined above, of from about 0.1:1 to about 1.5:1, is advantageously employed. Preferably, said reactant ratio is from about 0.2:1 to about 1:1.

Free radical type polymerization initiators suitably employed in this embodiment of the invention include azo compounds such as azoisobisbutyronitrile, peroxygen compounds such as sodium persulfate, benzoyl peroxide, lauroylperoxide, hydrogen peroxide and the like, and irradiation under the influence of high energy fields. Free radical type initiators most advantageously employed include the peroxygen compounds, with the persulfates, especially sodium persulfate, being preferred.

Temperatures suitably employed for polymerization of the acid are dependent on the particular acid and the polyalkylenepolyamine and epoxide employed and the relative proportions of each in the admixture. Typically, polymerization is suitably conducted at from about 25° to about 100° C. for from about 1 to about 6 hours. If desired, following polymerization, the acid moiety on the polymerized acid is easily converted to the salt moiety by conventional techniques.

The following examples are presented to illustrate the invention and should not be construed to limit its scope. In the examples, all parts and percentages are by weight unless otherwise indicated.

EXAMPLE 1

To a round bottom 5 l. flask equipped with a stirrer, thermometer, heating and cooling means and addition funnel is added 25 ml of an aqueous solution of 50 percent sodium hydroxide. The flask is heated with agitation to 110° C. To the heated flask is added a blend of 73 g of triethylenetetraamine and 176.5 g of a diglycidyl ether of bisphenol A having an epoxy equivalent of 172–176. The blend quickly disperses into small droplets upon its addition to the aqueous sodium hydroxide. Stirring of the mixture is continued for one hour. The mixture is then cooled to room temperature and the beads collected by filtration.

The collected beads are washed free of sodium hydroxide, swelled in an aqueous solution of 5 percent hydrochloric acid, returned to base form with an aqueous solution of 4 percent sodium hydroxide and then washed with water until neutral. At this point, the water swelled beads weigh 388 g. Ten g of the beads are dried, yielding 6.1 g of dried resin beads which is equivalent to a 95 percent yield based on the total weight of the triethylenetetraamine and diglycidyl ether of bisphenol A reactants. Examination of the beads shows the beads are clear, unbroken spheres having the following size distribution. The beads thus prepared are labeled PREPARATION 1.

| Diameter, mm | Weight Percent |
| --- | --- |
| Larger than 1.68 | 2.6 |
| 0.84–1.67 | 16.4 |
| 0.30–0.83 | 70.4 |
| 0.21–0.29 | 6.3 |

| -continued | |
|---|---|
| Diameter, mm | Weight Percent |
| 0.10–0.20 | 4.3 |

To a 1 l. flask equipped with a stirrer, thermometer, heating and cooling means and pH meter is added 200 g of chloroacetic acid, followed by 250 ml of water while maintaining the flask temperature below 20° C., an amount of 50 percent aqueous solution of sodium hydroxide is added to the flask to bring the pH to about 11. Addition of the sodium hydroxide converts the acid to a sodium salt form. To the flask is then added 200 g of the beads from PREPARATION 1 followed by the addition of 215 ml of water.

The flask is heated to 75° C. for 6 hours. During this period, additional amounts of the sodium hydroxide solution are added, as needed, to maintain the pH of the flask's contents at between about 10 and about 12. The flask is then cooled and the beads collected by filtration.

The collected beads are washed free of sodium hydroxide, swelled in an aqueous solution of 5 percent hydrochloric acid, returned to base form with an aqueous solution of 4 percent sodium hydroxide and then are washed with water until neutral. The beads are then collected by filtration using a Buchner funnel attached to a vacuum flask to remove interstitial water. At this point, the beads weigh 483.5 g. Upon drying in an oven, the beads are found to be 66 percent water and 34 percent solids.

The beads are found to have an excellent capacity for calcium of 0.66 milliequivalent per milliliter (meq/ml). The capacity for copper is found to be 0.85 meq/ml. Upon elution of the $Cu^{++}$ beads with sulfuric acid (1 M), it is found that about 15 percent of the copper is retained by the beads after the sulfuric acid treatment. Thus, the resin is shown to be an effective chelate resin.

EXAMPLE 2

The procedures of Example 1 are repeated except acrylic acid is substituted for the chloroacetic acid. The beads formed are found to be 75 percent water and have an excellent calcium capacity of 0.70 meq/ml, which corresponds to a dry weight capacity for calcium of 4.2 meq/g of dry resin. The beads also have an excellent copper capacity of 1.05 meq/ml, which corresponds to a dry weight capacity for copper of 6.2 meq/g of dry resin. Elution of the $Cu^{++}$ beads with sulfuric acid completely removes the copper from the bead. The resin beads thus formed are shown to be effective as a chelate resin.

EXAMPLE 3

Example 1 is repeated except chloropropionic acid is substituted for chloroacetic acid. The beads thus formed are found to have a calcium capacity of 0.22 meq/ml.

EXAMPLE 4

In a manner similar to the preparation of PREPARATION 1 of Example 1, 66 g of bis(2-aminoethyl)sulfide and 191 g of diglycidyl ether of bisphenol A are prepared in bead form. The beads thus prepared are reacted with the sodium salt of chloroacetic acid in a manner similar to Example 1. The reacted beads are found to have an excellent calcium capacity of 0.47 meq/ml, which corresponds to a capacity of 2.0 meq/g of dry resin.

EXAMPLE 5

In a manner similar to the preparation of PREPARATION 1 of Example 1, 30.4 g of the polyglycidyl ether of a phenol A formaldehyde novolac having an epoxy equivalent weight of 172–181 sold by The Dow Chemical Company as D.E.N. ®-438 and 18 g of triethylenetetraamine are prepared in bead form. The beads thus prepared are reacted with the sodium salt of acrylic acid in a manner similar to Example 1 to produce a bead which is 65 percent water. The reacted beads have an excellent copper capacity of 1:39 meq/ml, which corresponds to about 5.7 meq/g of dry resin.

EXAMPLE 6

A blend of 120 g of diglycidyl ether of bisphenol A and 50 g of triethylenetetraamine is prepared. The blend reacts exothermically at ambient conditions to form a hard resin block in about 20 to 25 minutes. The block cools to ambient temperatures and is then ground into small pieces. These resin pieces are swollen in water and the fraction of the swollen resin pieces, having a size such that they pass through a 20 mesh screen but do not pass through a 50 mesh screen, collected. They are found on drying to be 40 percent water swollen. These resin pieces are reacted with the sodium salt of chloroacetic acid in a manner similar to Example 1. The reacted resin pieces are found to have an excellent copper capacity of 0.86 meq/ml. This compares to the copper capacity of the resin beads formed in Example 1 with the same ingredients. The thus formed resins are shown in this manner to be effective as a chelate resin.

EXAMPLE 7

In a manner similar to Example 6, 120 g of diglycidyl ether of bisphenol A and 68 g of tetraethylenepentaamine is prepared as resin particles and reacted with the sodium salt of chloroacetic acid. The reacted resin particles have an excellent copper capacity of 0.71 meq/ml and calcium capacity of 0.64 meq/ml.

EXAMPLE 8

To a 500 ml flask equipped with a stirrer, thermometer, heating and cooling means and addition funnel is added 300 ml of water and 90 g of resin beads prepared in a manner similar to the preparation of PREPARATION 1 in Example 1. While agitating this mixture, 56 ml of glacial acrylic acid (having 200 ppm hydroquinone inhibitor) is added to the flask. The acid contacts the beads for about 30 minutes, during which time the beads swell to about twice their normal water swollen state. At this time, 0.5 g of sodium persulfate is added. The stirred mixture rises in temperature from about 30° C. to about 50° C. during the first 15 minutes following the persulfate addition. The mixture is then heated at 70° C. for 6 hours. The mixture is then cooled and the beads recovered by filtration.

The collected beads are washed free of sodum hydroxide, swelled in an aqueous solution of 4 percent sodium hydroxide and then washed with water to convert them to basic form and remove any unreacted acrylic acid. The beads in their water swollen state weigh 414 g and are 69 percent water. The increase in solids contents of the beads represents 98.2 percent of the acrylic acid charged.

The beads have an excellent copper capacity of 1.5 meq/ml. To test their chelating ability, a solution of 500 ppm nickel in an aqueous solution of 4 percent ammonium sulfate at a pH of 6 is passed over the beads in a column at a flow rate of 2 gal/min/ft³ of beads. Samples of the effluent are titrated until 1 ppm of nickel is detected in the effluent. The capacity for nickel in the presence of a large amount of ammonium ion is found in this manner to be 0.3 meq/ml or about 16 bed volumes of feed solution prior to detection of 1 ppm nickel in the effluent stream. As a means of comparison, the same test procedure using cross-linked polyacrylic acid beads sold by The Dow Chemical Company as DOWEX ® CCR-2 resulted in 1 ppm nickel in the effluent after about 2 bed volumes of the feed solution (equivalent to less than about 0.04 meq/ml). Thus, the reacted beads are shown in this manner to be effective as a chelate resin.

What is claimed is:

1. A method for preparing chelate resins comprising the step of contacting a cured reaction product of a polyamine of an aliphatic, alicyclic or aromatic hydrocarbon or an inertly substituted aliphatic, alicyclic or aromatic hydrocarbon and a polyfunctional epoxide with an effective amount of an alkali metal acid-salt of an $\alpha,\beta$-ethylenically unsaturated carboxylic acid and alkali metal acid salt of a halogenated carboxylic acid at conditions such that the carboxyl groups of the carboxyl containing compound become pendent to the polymer chain of the cured reaction product.

2. The method of claim 1 wherein the alkali metal acid-salt is the sodium salt of chloroacetic acid, chloropropionic acid, acrylic acid or methacrylic acid.

3. The method of claim 1 wherein the polyamine is ethylenediamine, diethylenetriamine, triethylenediamine, bis(2-aminoethyl)sulfide, polyethyleneimine, 1,3-propanediamine or 1,6-hexanediamine and the epoxide is epichlorohydrin, the diglycidyl ether of bisphenol A or the polyglycidyl ether of polyphenolformaldehyde.

4. The method of claim 1 wherein the reaction of the alkali metal acid-salt and the cured reaction product is carried out in an aqueous alkaline medium maintained at a pH from about 8 to about 14 and a temperature from about 50° to about 100° C. for a period from about 1 to about 10 hours.

5. The method of claim 1 wherein the cured reaction product and the resulting chelate resin are in the form of spheroidal beads.

6. The method of claim 5 wherein the reaction product of the polyfunctional epoxide and the polyamine is prepared in spheroidal bead form by the steps of (1) dispersing a blend of the polyfunctional epoxide and the polyamine in a reaction medium of a concentrated aqueous solution of an alkali metal hydroxide and (2) maintaining the dispersed blend at conditions sufficient to cure the dispersed blend in bead form.

7. A method for preparing a chelate resin comprising the steps of (1) diffusing into the cured reaction product of a polyfunctional epoxide and a polyamine of an aliphatic, alicyclic or aromatic hydrocarbon or an inertly substituted aliphatic, alicyclic or aromatic hydrocarbon an effective amount of an $\alpha,\beta$-ethylenically unsaturated carboxylic acid and (2) polymerizing the diffused acid.

8. The method of claim 7 wherein the diffusion of the unsaturated carboxylic acid into the cured reaction product is conducted by contacting the cured reaction product with the unsaturated carboxylic acid in an aqueous fluid at about 20° to about 30° C. for a period from about 0.1 to about 2 hours and the polymerization of the diffused acid is carried out in the presence of a free radical type polymerization initiator at a temperature from about 25° to about 100° C. for from about 1 to about 10 hours.

9. The method of claim 7 wherein the cured reaction product and the resulting chelate resin are in the form of spheroidal beads.

10. The method of claim 9 wherein the reaction product of the polyfunctional epoxide and the polyamine is prepared in spheroidal bead form by the steps of (1) dispersing a blend of the polyfunctional epoxide and the polyamine in a reaction medium of a concentrated aqueous solution of an alkali metal hydroxide and (2) maintaining the dispersed blend at conditions sufficient to cure the dispersed blend in bead form.

11. A chelate resin comprising a cured reaction product of a polyamine of an aliphatic, alicyclic or aromatic hydrocarbon or an inertly substituted aliphatic, alicyclic or aromatic hydrocarbon and an epoxide having incorporated therein a polyfunctional effective amount of a polymerizate of an alkali metal acid-salt of an $\alpha,\beta$-ethylenically unsaturated carboxylic acid.

12. The chelate resin of claim 11 wherein the alkali metal acid-salt is acrylic acid, methacrylic acid or an alkali metal salt thereof.

13. The chelate resin of claim 12 wherein the chelate resin is in the form of spheroidal beads.

14. A method for preparing a chelate resin, said method comprising the step of attaching an effective amount of carboxyl chelate active groups to a cured reaction product of a polyamine of an aliphatic, alicyclic, or aromatic hydrocarbon or an inertly substituted aliphatic, alicyclic or aromatic hydrocarbon and a polyfunctional epoxide in spheroidal bead form.

* * * * *

UNITED STATES PATENT AND TRADEMARK OFFICE
CERTIFICATE OF CORRECTION

PATENT NO. : 4,195,138
DATED : March 25, 1980
INVENTOR(S) : Eldon L. Ward

It is certified that error appears in the above-identified patent and that said Letters Patent are hereby corrected as shown below:

Col. 1, line 51, delete "may" and insert --many--.

Col. 2, line 66, delete "functionally" and insert --functionality--.

Col. 4, line 4, delete "empolyed" and insert --employed--.

Col. 6, line 56, delete "to" and insert --of--.

Col. 8, line 63, delete "about6" and insert --about 6--.

Col. 12, line 12, delete "1:39" and insert --1.39--.

Col. 12, line 58, delete "sodum" and insert --sodium--.

Col. 13, line 23, delete "and" and insert --or--.

Col. 13, line 26, delete "pendent" and insert --pendant--.

Signed and Sealed this

Second Day of December 1980

[SEAL]

Attest:

SIDNEY A. DIAMOND

Attesting Officer

Commissioner of Patents and Trademarks